(12) United States Patent
Bentley et al.

(10) Patent No.: US 10,858,108 B2
(45) Date of Patent: Dec. 8, 2020

(54) AISLE ACCESS SIDE FACING SEAT

(71) Applicant: Safran Seats USA LLC, Gainesville, TX (US)

(72) Inventors: Paul Bentley, Gainesville, TX (US); Jeremy Green, Lantana, TX (US); Joe Gaston, Atlanta, GA (US)

(73) Assignee: Safran Seats USA LLC, Gainesville, TX (US)

( * ) Notice: Subject to any disclaimer, the term of this patent is extended or adjusted under 35 U.S.C. 154(b) by 158 days.

(21) Appl. No.: 15/840,276

(22) Filed: Dec. 13, 2017

(65) Prior Publication Data
US 2019/0077512 A1   Mar. 14, 2019

Related U.S. Application Data (60) Provisional application No. 62/558,068, filed on Sep. 13, 2017.

(51) Int. Cl.
*B64D 11/06* (2006.01)
*B64D 11/00* (2006.01)

(52) U.S. Cl.
CPC ........ *B64D 11/0601* (2014.12); *B64D 11/064* (2014.12); *B64D 11/0606* (2014.12); *B64D 11/0015* (2013.01); *B64D 11/0605* (2014.12); *B64D 2011/0053* (2013.01)

(58) Field of Classification Search
CPC ............ B64D 11/0601; B64D 11/0602; B64D 11/064
See application file for complete search history.

(56) References Cited

U.S. PATENT DOCUMENTS

| | | | |
|---|---|---|---|
| 2,632,408 A * | 3/1953 | Giles ................. | B64D 11/0601 105/344 |
| 5,636,898 A | 6/1997 | Dixon et al. | |
| 2010/0164265 A1 * | 7/2010 | Tomandl ............. | B60N 2/0224 297/326 |
| 2018/0273185 A1 | 9/2018 | Gill et al. | |
| 2018/0290562 A1 * | 10/2018 | Cheung ................. | B64D 11/00 |
| 2019/0308732 A1 * | 10/2019 | Croudace ............. | B64D 11/064 |

FOREIGN PATENT DOCUMENTS

| | | |
|---|---|---|
| FR | 1311972 | 12/1962 |
| WO | 2007128978 | 11/2007 |
| WO | 2014049362 | 4/2014 |
| WO | 2018078374 | 5/2018 |
| WO | 2018187071 | 10/2018 |

OTHER PUBLICATIONS

Europe Patent Application No. 18203592.3, Search Report, dated Apr. 5, 2019.

* cited by examiner

*Primary Examiner* — Timothy D Collins
*Assistant Examiner* — Terri L Filosi
(74) *Attorney, Agent, or Firm* — Kilpatrick Townsend & Stockton LLP (57) ABSTRACT

A passenger seat arrangement is provided for a single-aisle vehicle, such as a narrow-body aircraft. In some examples, the passenger seat includes a passenger seat having a seat plane. The passenger seat is positioned such that the seat plane is at a non-square and non-zero acute angle relative to a plane of the aisle. The passenger seat is a non-lie flat seat movable between an upright position and a neutral position. A seat back of the passenger seat is at a non-zero angle relative to a seat base of the passenger seat in both the upright position and the neutral position.

20 Claims, 9 Drawing Sheets

FIG. 9

AISLE ACCESS SIDE FACING SEAT

REFERENCE TO RELATED APPLICATIONS

This application claims the benefit of U.S. Provisional Application No. 62/558,068, filed Sep. 13, 2017 and entitled AISLE ACCESS SIDE FACING SEAT, the content of which is hereby incorporated by reference in its entirety.

FIELD OF THE INVENTION

This application relates to passenger seats, and more particularly to passenger seats for narrow-body aircraft that are side-facing, non-flat seats with aisle access.

BACKGROUND

Some passenger vehicles, such as aircraft, buses, trains, ships, and automobiles, are single-aisle vehicles in which passenger seats are arranged along a single aisle. For example, a narrow-body aircraft (or single-aisle aircraft) is an airliner with passenger seats arranged along a single aisle and typically up to six-abreast seating due to the diameter of the fuselage. In contrast, a wide-body aircraft is a larger airliner usually configured with multiple aisles due to a larger diameter of the fuselage. While multiple-aisle vehicles are able to provide more passenger seats with aisle access, such vehicles are often too large, costly, or otherwise impractical to use in certain settings (e.g., for short haul flights). On the other hand, providing an increased number of traditional passenger seats with aisle access on a single-aisle vehicle may significantly decrease the seating capacity of the single-aisle vehicle and/or negatively impact the spacing of the aisle. Therefore, there is a need for passenger seats for single-aisle vehicles (such as narrow-body aircraft) that provide direct aisle access.

SUMMARY

The terms "invention," "the invention," "this invention" and "the present invention" used in this patent are intended to refer broadly to all of the subject matter of this patent and the patent claims below. Statements containing these terms should be understood not to limit the subject matter described herein or to limit the meaning or scope of the patent claims below. Embodiments of the invention covered by this patent are defined by the claims below, not this summary. This summary is a high-level overview of various embodiments of the invention and introduces some of the concepts that are further described in the Detailed Description section below. This summary is not intended to identify key or essential features of the claimed subject matter, nor is it intended to be used in isolation to determine the scope of the claimed subject matter. The subject matter should be understood by reference to appropriate portions of the entire specification of this patent, any or all drawings, and each claim.

According to certain examples, a passenger seat arrangement for a single-aisle vehicle, such as a narrow-body or single-aisle aircraft, includes a first passenger seat and a second passenger seat. The first passenger seat includes a first seat base, a first seat back, and a first seat plane. The second passenger seat includes a second seat base, a second seat back, and a second seat plane. An aisle is defined between the first passenger seat and the second passenger seat and includes an aisle plane extending in a forward and aft direction. In various examples, the first passenger seat is a non-lie flat passenger seat moveable between an upright position and a neutral position, and the first seat back is at a non-zero angle relative to the first seat base in both the upright position and the neutral position. In some aspects, the second passenger seat is a non-lie flat passenger seat movable between an upright position and a neutral position, and the second seat back is at a non-zero angle relative to the second seat base in both the upright position and the neutral position. In certain examples, the first seat plane is at a non-square and non-zero angle relative to the aisle plane, and the second seat plane is at a non-square and non-zero angle relative to the aisle plane.

In some examples, the first seat plane and the second seat plane are each at the non-square and non-zero angle in the aft direction such that a front surface of the first seat back is aft-facing and a front surface of the second seat back is aft-facing. In some cases, the first seat plane and the second seat plane are each at the non-square and no-zero angle in the forward direction such that a front surface of the first seat back is forward-facing and a front surface of the second seat back is forward-facing. According to various examples, the angle between the first seat plane and the aisle plane is greater than 0 degrees and less than 90 degrees. In some aspects, the angle is 20 degrees. In various examples, one of the first seat plane or the second seat plane is at the non-square and non-zero acute angle in the aft direction such that one of the first seat back or the second seat back is aft-facing, and the other of the first seat plane or the second seat plane is at the non-square and non-zero acute angel in the forward direction such that the other of the first seat back or the second seat back is forward-facing.

In some aspects, the first seat back and the second seat back are both inboard-facing and face the aisle. In various cases, the first seat back and the second seat back are both outboard-facing and face away from the aisle. In certain examples, one of the first seat back or the second seat back is inboard-facing and facing the aisle, and the other of the first seat back or the second seat back is outboard-facing and facing away from the aisle.

According to certain cases, the angle between the first seat plane and the aisle plane is a mirrored angle of the angle between the second seat plane and the aisle plane. In some examples, the first passenger seat and the second passenger seat each have direct access to the aisle.

In various cases, the passenger seat arrangement further includes a third passenger seat aft of the first passenger seat and including a third seat base, a third seat back, and a third seat plane. In some examples the third passenger seat is a non-lie flat passenger seat moveable between an upright position and a neutral position, and the third seat back is at a non-zero angle relative to the third seat base in both the upright position and the neutral position. In certain examples, the passenger seat arrangement further includes a fourth passenger seat aft of the second passenger seat and including a fourth seat base, a fourth seat back, and a fourth seat plane. In various aspects, the fourth passenger seat is a non-lie flat passenger seat moveable between an upright position and a neutral position, and the fourth seat back is at a non-zero angle relative to the fourth seat base in both the upright position and the neutral position. In various aspects, the aisle is defined between the third passenger seat and the fourth passenger seat, the third seat plane is at a non-square and non-zero angle relative to the aisle plane, the fourth seat plane is at a non-zero and non-zero angle relative to the aisle plane, and the first passenger seat, second passenger seat, third passenger seat, and fourth passenger seat each have direct access to the aisle.

In some examples, a width of the aisle when the first passenger seat and the second passenger seat are in the upright positions is the same as a width of the aisle when the first passenger seat and the second passenger seat are in the neutral positions.

According to various examples, a method of installing a passenger seat arrangement in a single-aisle aircraft includes: (a) providing a first passenger seat including a first seat base, a first seat back, and a first seat plane, where the first passenger seat is a non-lie flat passenger seat moveable between an upright position and a neutral position, and where the first seat back is at a non-zero angle relative to the first seat base in both the upright position and the neutral position; (b) providing a second passenger seat comprising a second seat base, a second seat back, and a second seat plane, where the second passenger seat is a non-lie flat passenger seat movable between an upright position and a neutral position, and where the second seat back is at a non-zero angle relative to the second seat base in both the upright position and the neutral position; (c) defining an aisle having an aisle plane extending in a forward and aft direction between the first passenger seat and the second passenger seat; (d) positioning the first passenger seat such that the first seat plane is at a non-square and non-zero angle relative to the aisle plane; and (e) positioning the second passenger seat such that the second seat plane is at a non-square and non-zero angle relative to the aisle plane.

In certain examples, positioning the first passenger seat includes providing direct aisle access to the first passenger seat, and positioning the second passenger seat includes providing direct aisle access to the second passenger seat. In some aspects, positioning the first passenger seat and the second passenger seat includes angling the first seat plane and the second seat plane at the non-square and non-zero angle in the aft direction such that a front surface of the first seat back is aft-facing and a front surface of the second seat back is aft-facing. In various cases, positioning the first passenger seat and the second passenger seat includes angling the first seat plane and the second seat plane at the non-square and non-zero angle in the forward direction such that a front surface of the first seat back is forward-facing and a front surface of the second seat back is forward-facing.

In some examples, positioning the first passenger seat and the second passenger seat includes angling the first passenger seat and the second passenger seat such that the angle between the first seat plane and the aisle plane is a mirrored angle of the angle between the second seat plane and the aisle plane. In various examples, positioning the first passenger seat includes angling the first passenger seat such that the angle between the first seat plane and the aisle plane is 20 degrees.

According to certain examples, a passenger seat for a single-aisle aircraft includes a seat base, a seat back, and a central plane. In some cases, the seat base and the seat back are aligned along the central plane. In various aspects, the passenger seat is a non-lie flat passenger seat moveable between an upright position and a neutral position, where the seat back is at a non-zero angle relative to the seat base in both the upright position and the neutral position. In certain aspects, the passenger seat is configured for arrangement in the single-aisle aircraft such that the central plane of the passenger seat is at a non-square and non-zero angle relative to a longitudinal plane of the single-aisle aircraft.

In some cases, the angle between the central plane and the longitudinal plane is greater than 0 degrees and less than 90 degrees. In various aspects, the angle is 20 degrees. In certain aspects, the angle between the seat back and the seat base in the upright position and the angle between the seat back and the seat base in the neutral position are different. In some examples, the angle between the seat back and the seat base in the upright position is 96 degrees and the angle between the seat back and the seat base in the neutral position is 130 degrees.

Various implementations described in the present disclosure can include additional systems, methods, features, and advantages, which cannot necessarily be expressly disclosed herein but will be apparent to one of ordinary skill in the art upon examination of the following detailed description and accompanying drawings. It is intended that all such systems, methods, features, and advantages be included within the present disclosure and protected by the accompanying claims.

BRIEF DESCRIPTION OF THE DRAWINGS

The features and components of the following figures are illustrated to emphasize the general principles of the present disclosure. Corresponding features and components throughout the figures can be designated by matching reference characters for the sake of consistency and clarity.

DETAILED DESCRIPTION

The subject matter of embodiments of the present invention is described here with specificity to meet statutory requirements, but this description is not necessarily intended to limit the scope of the claims. The claimed subject matter may be embodied in other ways, may include different elements or steps, and may be used in conjunction with other existing or future technologies. This description should not be interpreted as implying any particular order or arrangement among or between various steps or elements except when the order of individual steps or arrangement of elements is explicitly described. Directional references such as "forward," "aft," "up," "down," "top," "left," "right," "front," and "back," among others are intended to refer to the orientation as illustrated and described in the figure (or figures) to which the components and directions are referencing.

In one aspect, disclosed are a passenger seat and passenger seat arrangements for single-aisle vehicles such as narrow-body aircraft, and associated methods, systems, devices, and various apparatus. The passenger seat is angled relative to a longitudinal plane of the aircraft, provides direct access to the aisle, and is a non-lie flat seat. It would be understood by one of skill in the art that the disclosed passenger seat and passenger seat arrangement are described in but a few exemplary aspects among many.

In some examples, the passenger seat includes a seat plane, and the passenger seat is angled relative to a longitudinal plane of the vehicle extending in the forward and aft direction such that the seat plane is at a non-zero and non-square angle relative to the longitudinal plane. The passenger seat may be angled in the forward direction or in the aft direction. The passenger seat provides direct access to the aisle of the single-aisle vehicle. The passenger seat is a non-lie flat seat, meaning that a seat back does not recline relative to a seat base of the passenger seat to form a flat surface. The passenger seat is movable between an upright position (also known as a taxiing, take-off, and landing (TTL) position) and a neutral or zero gravity position (also known as a perfect posture position). In both the upright position and the neutral position, the seat back is at a non-zero angle relative to the seat base.

Figure 1:
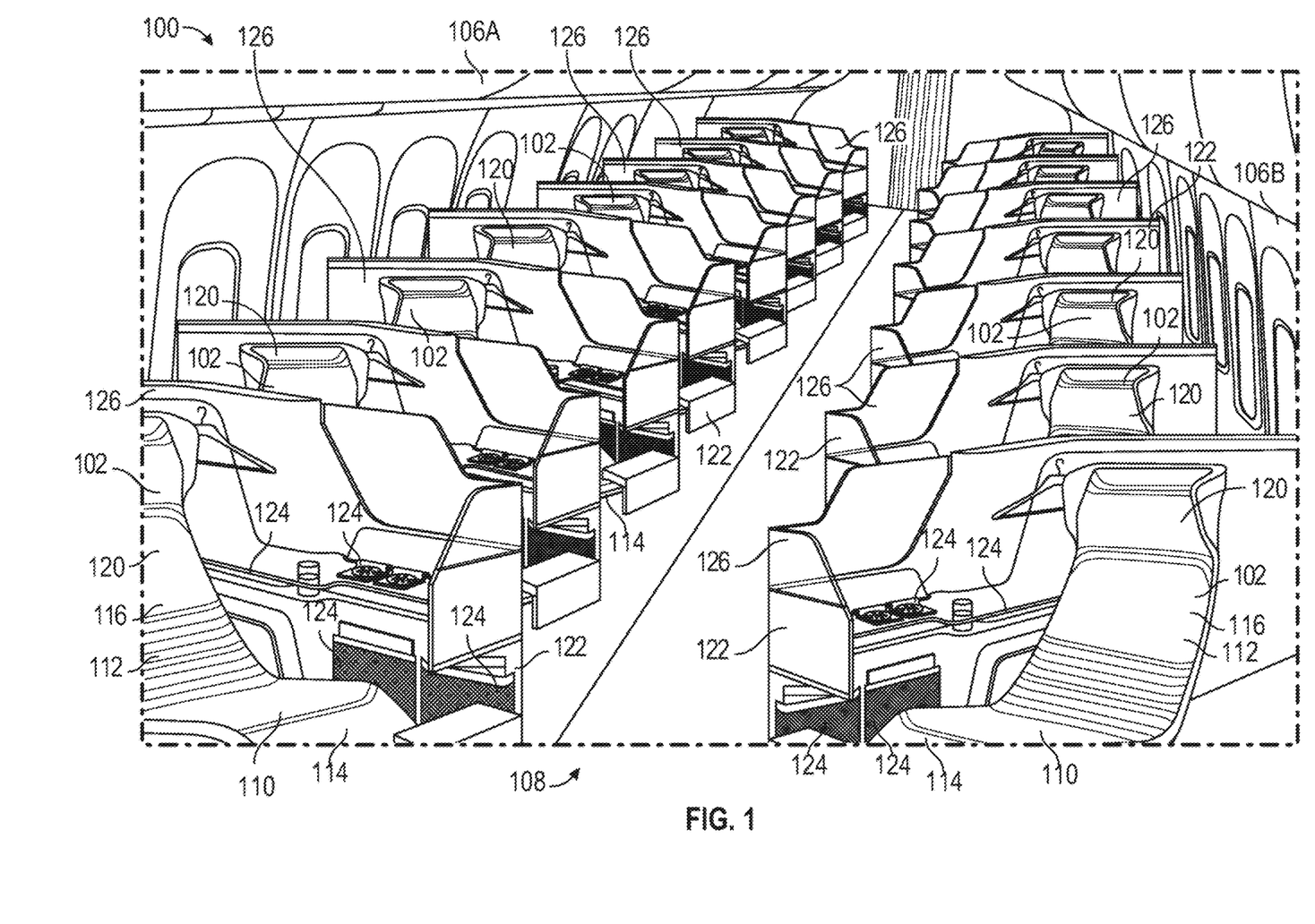
FIG. 1 is a perspective view of a passenger seat arrangement in a narrow-body aircraft according to aspects of the current disclosure.
Figure 2:
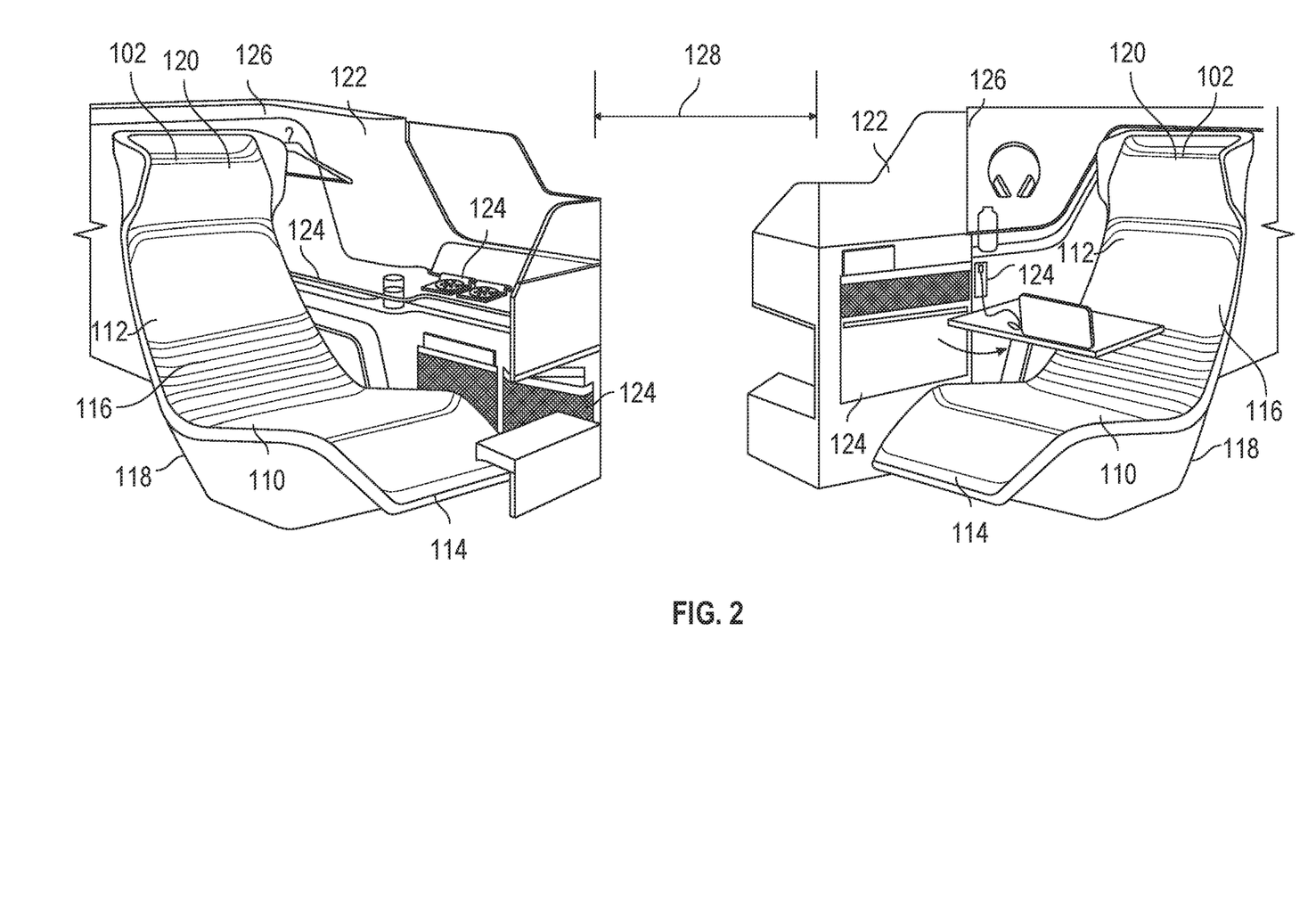
FIG. 2 is a perspective view of a row passenger seat assemblies of the passenger seat arrangement of FIG. 1.

FIGS. 1-2 illustrate an example of a passenger seat arrangement 100 having a plurality of passenger seat assemblies 102. The passenger seat arrangement 100 is provided in a narrow-body aircraft 104 having opposing side walls 106A-B and a single aisle 108. The narrow-body aircraft 104 includes a longitudinal direction extending forward and aft. As described in detail below, the aisle 108 has a central aisle plane extending in the longitudinal direction, and each passenger seat assembly has a central seat plane that is angled at a non-square and non-zero angle relative to the central aisle plane. While the narrow-body aircraft 104 is disclosed, it will be appreciated that the passenger seat arrangement 100 may be provided in various other single-aisle vehicles.

In various examples, the passenger seat assemblies 102 are arranged in rows. In various examples, the aisle 108 is defined between adjacent seat assemblies 102 in a row, and an aisle width 128 (see FIG. 2) is the distance between the adjacent seat assemblies 102. Each seat assembly 102 has direct access to the aisle 108 because the seat assemblies 102 are angled relative to the aisle plane and is movable between an upright and neutral position as described below. As used herein, direct aisle access means that a passenger sitting in one of the seat assemblies 102 need not climb over or past another seat assembly 102 to access the aisle 108.

As illustrated in FIGS. 1 and 2, each passenger seat assembly 102 includes a seat base 110 and a backrest 112. Optionally, the seat base 110 includes a leg rest 114, although it need not. When included with the seat base 110, the shape of the leg rest 114 should not be considered limiting on the current disclosure. The backrest 112 includes a forward side 116 and an aft side 118 (see FIG. 2) opposite the forward side 116. When used by a passenger, the forward side 116 is a side against which the passenger may rest his or her back, and the aft side 118 generally faces away from the passenger when used. As described in detail below, in the passenger seat arrangement 100, each passenger seat assembly 102 may be angled such that the forward side 116 faces the forward direction of the narrow-body aircraft 104 or the aft direction of the narrow-body aircraft 104, and may be inboard-facing (i.e., facing the aisle 108) or outboard-facing (i.e., facing the corresponding adjacent wall 106A-B). In some examples, the passenger seat assemblies 102 may all face a similar direction (e.g., all inboard-facing in the forward direction). In other examples, some of the passenger seat assemblies 102 of the passenger seat arrangement 100 may face one direction (e.g., inboard-facing in the forward direction) and some of the passenger seat assemblies 102 may face another direction (e.g., inboard-facing in the aft direction, outboard-facing in the forward direction, outboard-facing in the aft direction, etc.). In various examples, the passenger seat assemblies 102 are arranged such that each passenger seat assembly 102 has direct access to the aisle 108.

Figure 7:
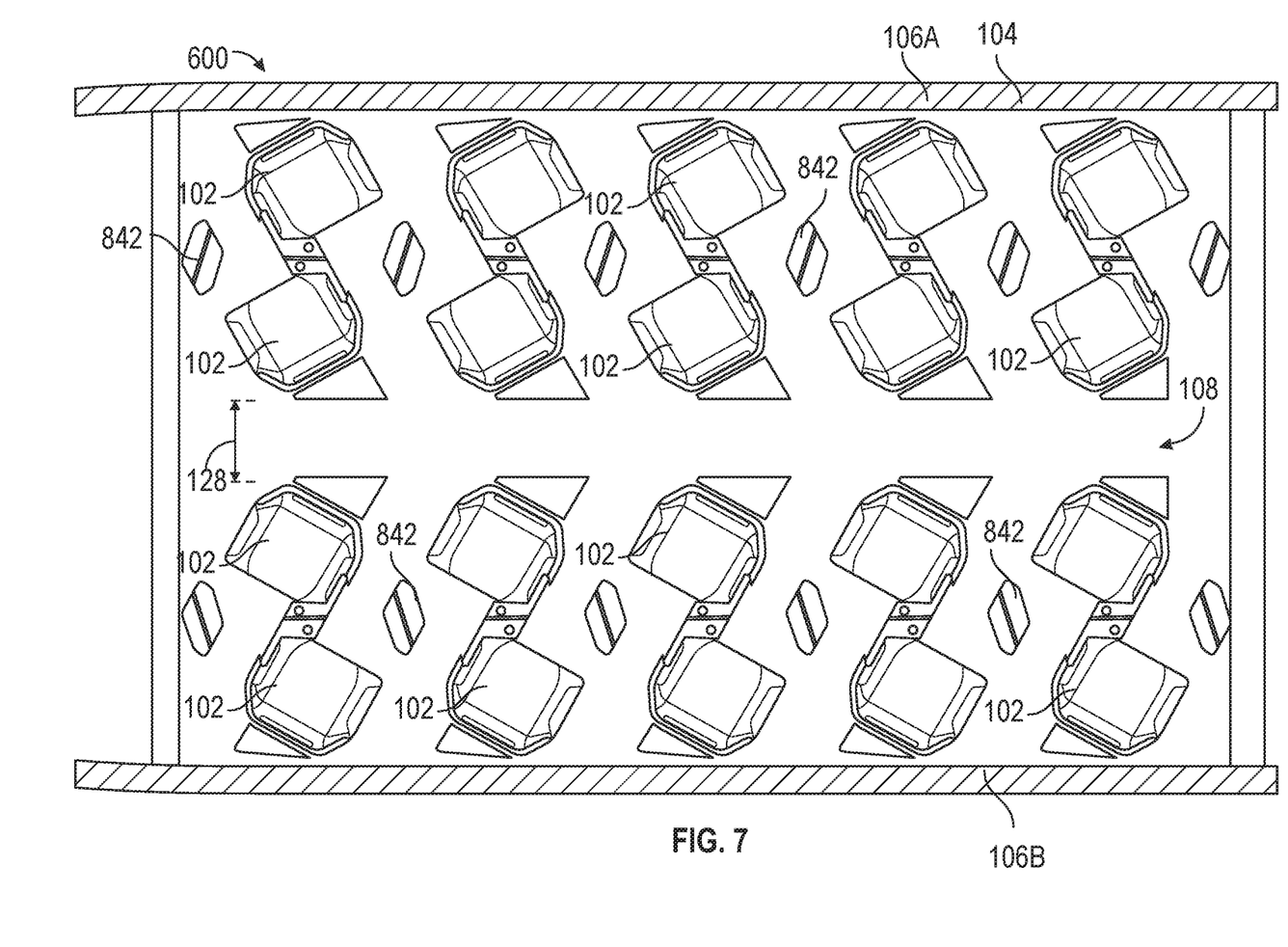
FIG. 7 is a plan view of the passenger seat arrangement of FIG. 6 with the passenger seat assemblies in an upright position.
Figure 8:
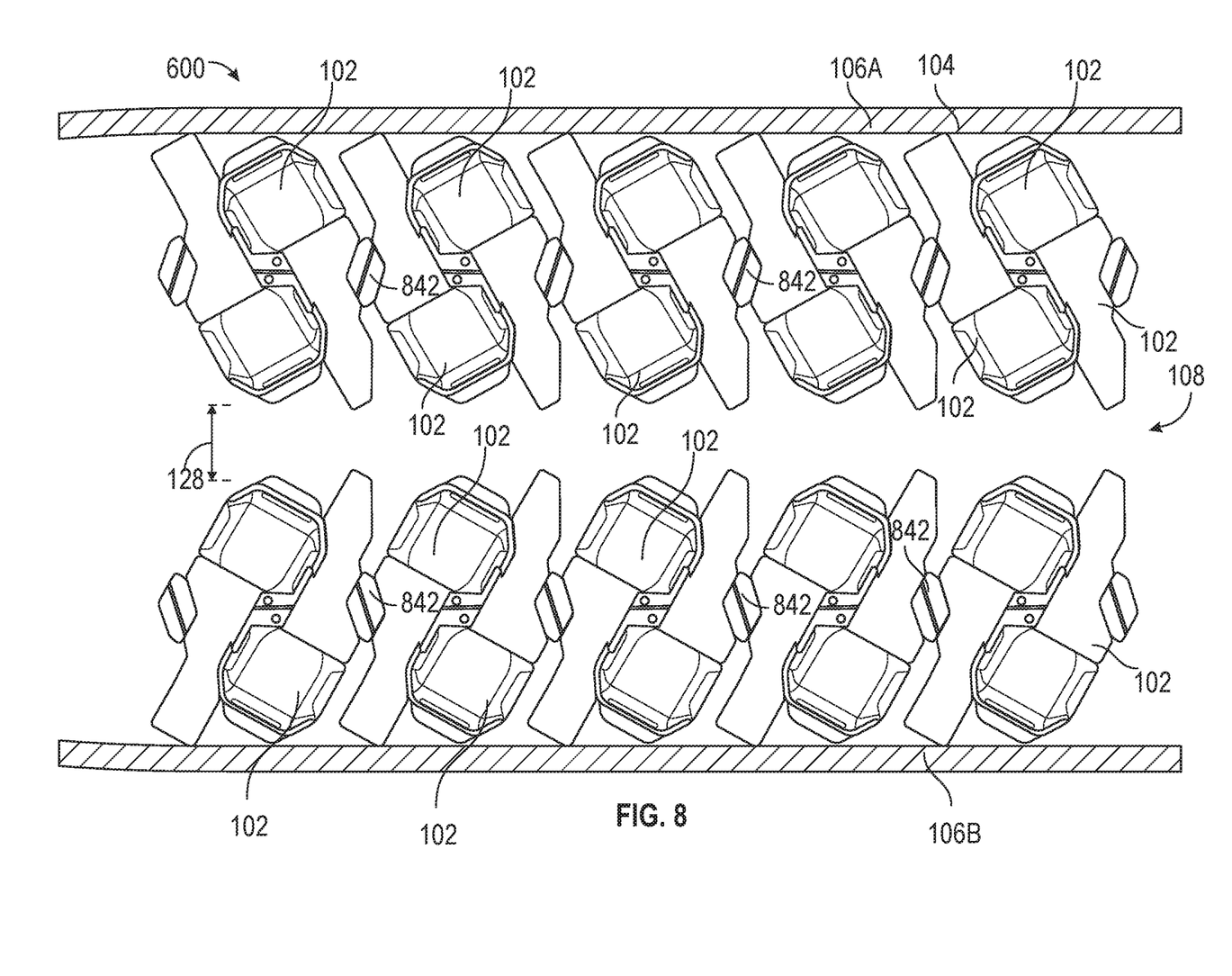
FIG. 8 is a plan view of the passenger seat arrangement of FIG. 7 with the passenger seat assemblies in a neutral position.

In various examples, each seat assembly 102 is movable between an upright position (see, e.g., FIG. 7) and a zero-gravity or neutral position (see, e.g., FIG. 8). In the zero-gravity or neutral position (also sometimes known as the perfect posture position or neutral body posture), the seat back and the seat base are positioned such that when a passenger is in the passenger seat, his or her head knees are elevated above the stomach and/or lower back region. In the neutral position, the passenger's weight may be more evenly distributed throughout the chair and may reduce joint pressure, compression, strain, etc. on the passenger. As such, each seat assembly 102 is a non-lie flat seat because in both the upright position and the neutral position, the backrest 112 is at a non-zero angle relative to the corresponding base 110. In various examples, the angle between the backrest 112 and the base 110 in the upright position is from about 90 degrees to about 100 degrees, such as from about 92 degrees to about 98 degrees, such as from about 96 degrees to about 94 degrees. In one non-limiting example, the angle between the backrest 112 and the base 110 in the upright position is about % degrees. In various examples, the angle between the backrest 112 and the base 110 in the neutral position is from about 125 degrees to about 135 degrees, such as from about 127 degrees to about 131 degrees. In one non-limiting example, the angle between the backrest 112 and the base 110 in the neutral position is about 130 degrees. In some examples, a sat pan of the base 110 in the upright position is at about a 7 degree angle off the floor plane, and the angle increases to about 15 degrees in the neutral position. In various examples, the seat assemblies 102 movable between the upright position and the neutral position allows for the seat arrangement 100 that both maximizes the number of seat assemblies 102 provided within the aircraft 104 and maintains the aisle 108 (i.e., the seat assemblies 102 do not obstruct the aisle 108 and/or reduce a width of the aisle 108). In certain examples, the width of the aisle 108 is maintained when adjacent seat assemblies 102 are in the upright positions and the neutral positions.

Various covers may cover cushioning and frame members forming the base 110 and backrest 112. Optionally, each seat assembly 102 may include a headrest 120, armrest, and/or various other components as desired, although it need not.

In some examples, one or more privacy consoles 122 may be provided with each passenger seat assembly 102. The privacy console 122 may include various equipment 124 and/or features including, but not limited to, In-Flight Entertainment (IFE) monitors, reading lights, aisle windows, cable stowage, cable charging, cup holders, storage pockets, universal holders, tray tables, shelves, and/or various other equipment as desired. In some examples, each console 122 includes a wall 126. In certain cases, the wall 126 has a height that may be less than a height of the seat assembly 102, greater than the height of the seat assembly 102, or substantially the same as the height of the seat assembly. In various examples, the wall 126 has a wall width that may be varied depending on components included with the console 122 and/or desired spacing between longitudinally adjacent seat assemblies 102. In some non-limiting examples, the width may be about 5 inches, about 3 inches, or about 1 inch. In other examples, the width may be greater than 5 inches, less than 1 inch, or various other widths between 1 inch and 5 inches. In some examples, the wall 126 may at least partially surround the seat assembly 102 (see, e.g., FIGS. 1-3), while in other examples, it need not (see, e.g., FIGS. 4-6). As such, the shape of the wall 126 (or console 122) should not be considered limiting on the current disclosure.

Figure 3:
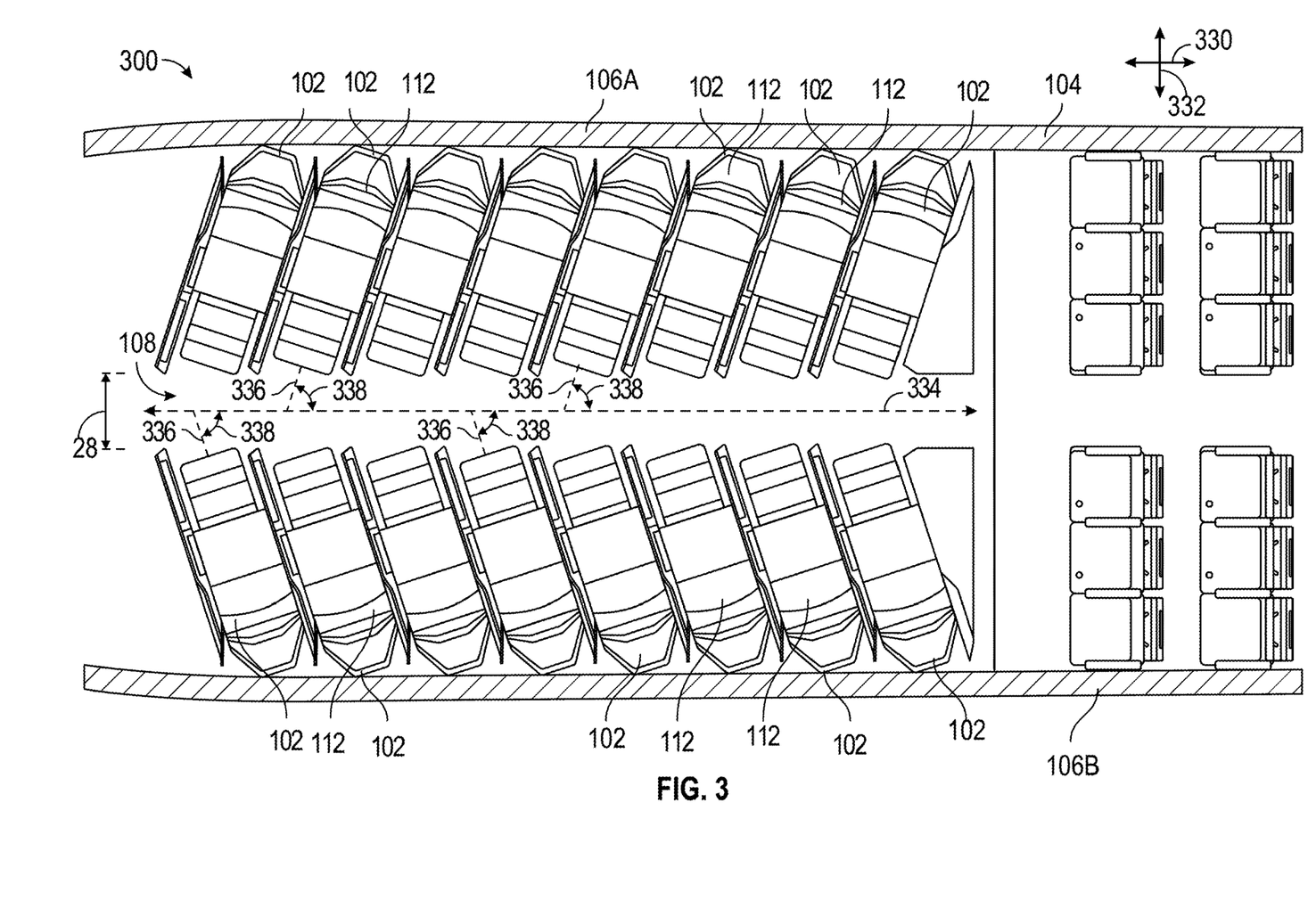
FIG. 3 is a plan view of a passenger seat arrangement in a narrow-body aircraft according to aspects of the current disclosure.
Figure 4:
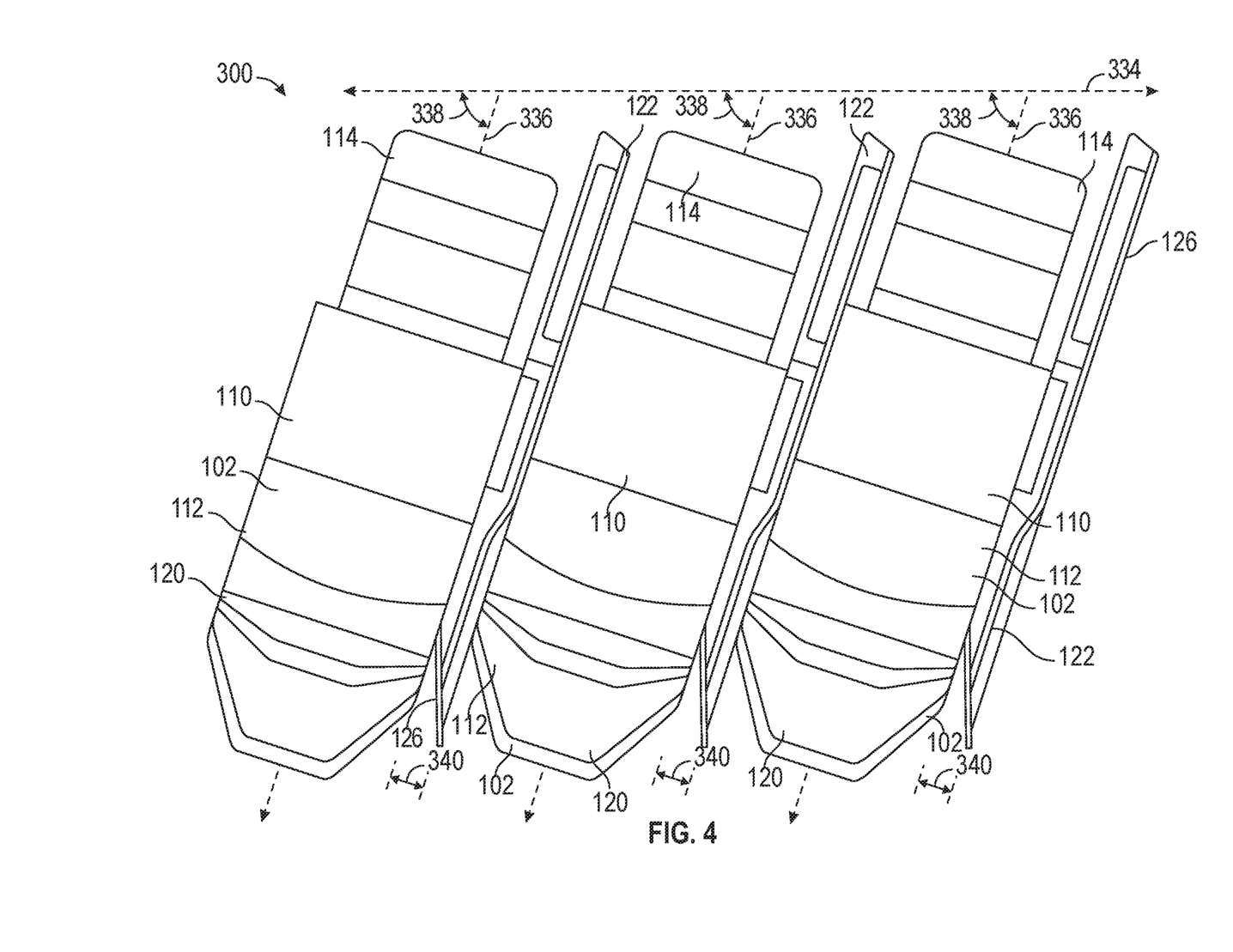
FIG. 4 is a plan view of three passenger seat assemblies of the passenger seat arrangement of FIG. 3.

FIGS. 3 and 4 illustrate another example of a passenger seat arrangement 300. The passenger seat arrangement 300 is substantially similar to the passenger seat arrangement 100 except that the wall 126 of the privacy console 122 is only between longitudinally-adjacent passenger seat assemblies 102.

As illustrated in FIG. 3, the narrow-body aircraft 104 defines the longitudinal direction 330 extending forward (i.e., to the left side of FIG. 3) and aft (i.e., to the right side of FIG. 3) and a lateral direction 332 perpendicular to the longitudinal direction 330. The aisle 108 has a central aisle plane 334 extending in the longitudinal direction 330.

Each passenger seat assembly 102 defines a central seat plane 336 that bisects the base 110 and the backrest 112. In various examples, the central seat plane 336 of each seat assembly 102 intersects the central aisle plane 334 at a non-zero and non-square acute angle 338. In some examples, the acute angle 338 is from greater than 0° to less than 90°, such as from about 10° to about 80°, such as from about 20° to about 70°, such as from about 30° to about 60°, such as 40° to about 50°. In one non-limiting example, the angle 338 is about 70°. In another non-limiting example, the angle 338 is about 40°.

In certain examples, each passenger seat assembly 102 is at the angle 338 such that the passenger seat assembly 102 is either forward-facing (e.g., to the left in FIG. 3) (i.e., the forward side 116 of the backrest 112 is forward-facing and the aft side 118 of the backrest 112 is aft-facing) or aft-facing (e.g., to the right in FIG. 3) (i.e., the forward side 116 of the backrest 112 is aft-facing and the aft side 118 of the backrest 112 is aft-facing). In some examples, all of the passenger seat assemblies 102 of the passenger seat arrangement 100 are forward-facing or aft-facing (see, e.g., FIGS. 3 and 5). In other examples, some of the passenger seat assemblies 102 are forward-facing and some of the passenger seat assemblies 102 are aft-facing (see, e.g., FIG. 7).

In various examples, each passenger seat assembly 102 is at the angle 338 such that the passenger seat assembly 102 is inboard-facing (i.e., the forward side 116 of the backrest 112 is facing the aisle 108) or outboard-facing (i.e., the forward side 116 of the backrest 112 is facing the adjacent wall 106A-B (or away from the aisle 108)). In some examples, all of the passenger seat assemblies 102 of the passenger seat arrangement 100 are either inboard-facing or outboard-facing (see, e.g., FIGS. 3 and 5). In other examples, some of the passenger seat assemblies 102 are inboard-facing and some of the passenger seat assemblies 102 are outboard-facing (see, e.g., FIG. 7). In FIGS. 3 and 4, all of the passenger seat assemblies 102 are inboard-facing and forward-facing.

In various examples, in a row of seat assemblies 102, the acute angle 338 between the central seat plane 336 and the central aisle plane 334 of one seat assembly 102 is a mirrored angle about the central aisle plane 334 of the acute angle 338 between the central seat plane 336 and the central aisle plane 334 of an adjacent seat assembly 102. In various examples, the seat arrangement 100 with the seat assemblies 102 at the acute angle 338 relative to the central aisle plane 334 and movable between the upright and neutral position allows for a maximum number of seat assemblies 102 with direct access to the aisle 108 while maintaining the aisle 108 on the narrow-body aircraft 104.

As illustrated in FIG. 4, each wall 126 of the privacy console 122 has a width 340. As described previously, the width may be varied depending on components included with the console 122 and/or desired spacing between longitudinally adjacent seat assemblies 102

Figure 5:
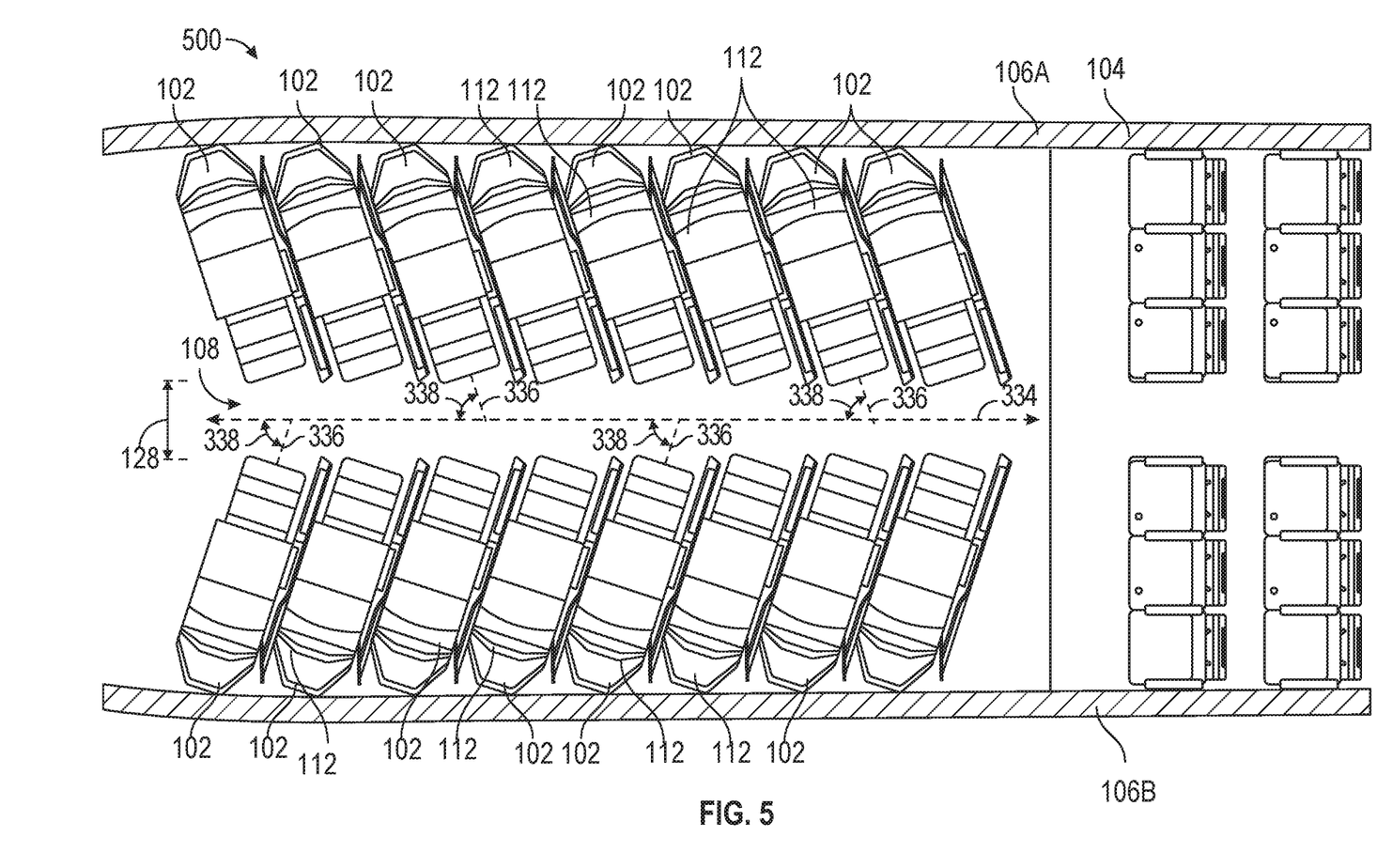
FIG. 5 is a plan view of a passenger seat arrangement in a narrow-body aircraft according to aspects of the current disclosure.

FIG. 5 illustrates an example of a passenger seat arrangement 500. The passenger seat arrangement 500 is substantially similar to the passenger seat arrangement 300 of FIGS. 3 and 4 except that all of the passenger seat assemblies 102 are inboard-facing and aft-facing.

Figure 6:
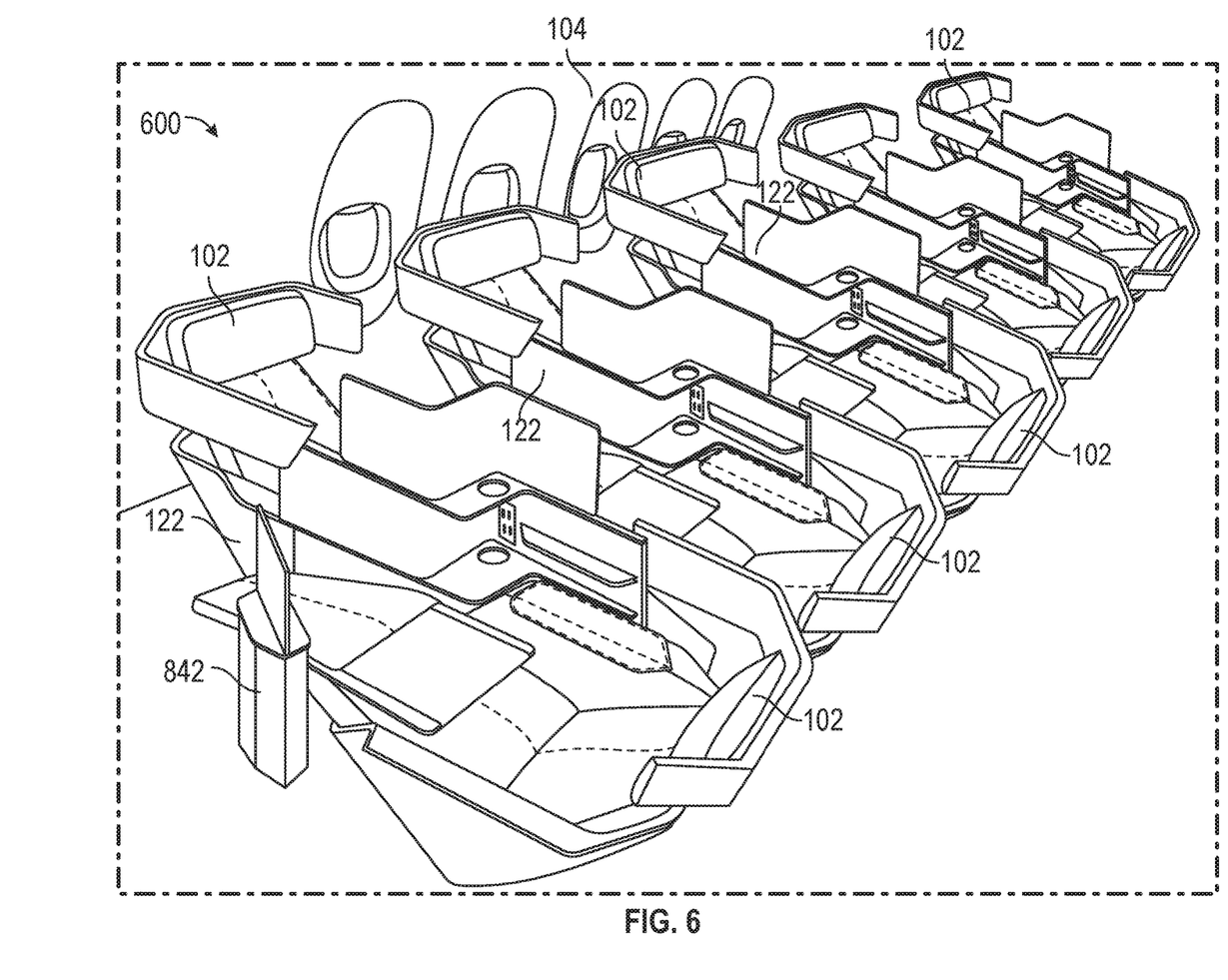
FIG. 6 is a perspective view of a portion of a passenger seat arrangement in a narrow-body aircraft according to aspects of the current disclosure.

FIGS. 6-8 illustrate an example of a passenger seat arrangement 600. The passenger seat arrangement 600 is substantially similar to the passenger seat arrangements 100, 300, and 500 except that some of the passenger seat assemblies 102 are inboard-facing and some of the passenger seat assemblies 102 are outboard-facing. In the present example, the inboard-facing seat assemblies 102 are aft-facing and the outboard-facing seat assemblies 102 are forward-facing. In other examples, some (or all) of the inboard-facing seat assemblies 102 may be forward facing and/or some (or all) of the outboard-facing seat assemblies 102 may be aft-facing.

As illustrated in FIGS. 7 and 8, each seat assembly 102 is movable between an upright position (FIG. 7) and a neutral position (FIG. 8). As described previously, in both the upright position and the neutral position, the backrest 112 is at a non-zero angle relative to the base 110. In some examples, in the neutral position, the passenger seat assembly 102 elevates the passenger's legs compared to the upright position.

Compared to the passenger seat arrangement 100, 300, and 500, a single console 122 in the passenger seat arrangement 600 may be shared by longitudinally adjacent seat assemblies 102. In other examples, the passenger seat arrangements 100, 300, and/or 500 may include shared consoles 122. In some examples, the console 122 is shared between an inboard-facing seat assembly 102 and an outboard-facing seat assembly 102, although it need not be. Optionally, the passenger seat arrangement 600 includes a secondary privacy partition 842. In some cases, the secondary privacy partition 842 may be utilized between longitudinally-adjacent inboard-facing and outboard-facing seat assemblies 102 that do not share the same console 122.

Figure 9:
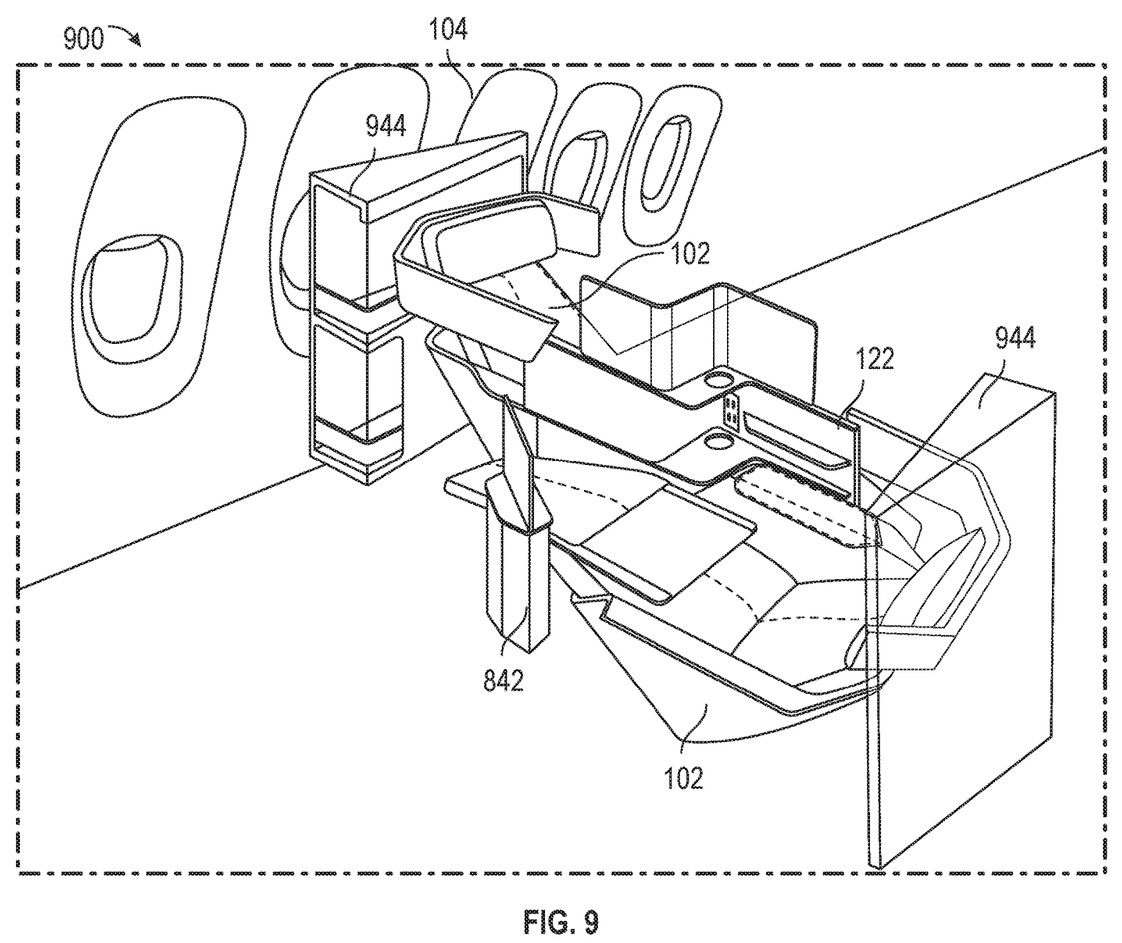
FIG. 9 is a perspective view of two passenger seat assemblies of a passenger seat arrangement in a narrow-body aircraft according to aspects of the current disclosure.

FIG. 9 illustrates an example of two passenger seat assemblies 102 of a passenger seat arrangement 900. The passenger seat arrangement 900 is substantially similar to the passenger seat arrangement 600 except that additional stowage 944 is provided with each passenger seat assembly 102.

According to various examples, a method of installing the passenger seat arrangement 300 is provided. Although reference is made to the passenger seat arrangement 300, it will be understood that a similar method may be used to install any of the passenger seat arrangements 100, 500, 600, and/or 900.

In various examples, the method includes positioning a first passenger seat assembly 102 and a second passenger seat assembly 102 in the narrow-body aircraft 104 and defining the aisle 108 between the first and second passenger seat assemblies 102. In some examples, the method includes positioning the first passenger assembly 102 such that the central seat plane 336 of the first seat assembly 102 is at the non-square and non-zero acute angle 338 relative to the central aisle plane 334. In various aspects, the method includes positioning the second passenger seat assembly 102 such that the central seat plane 336 of the second seat assembly 102 is at a non-square and non-zero acute angle 338 relative to the central aisle plane 334. In some cases, the passenger seat assemblies 102 are positioned such that each passenger seat assembly 102 has direct access to the aisle 108.

A collection of exemplary embodiments, including at least some explicitly enumerated as "ECs" (Example Combinations), providing additional description of a variety of embodiment types in accordance with the concepts described herein are provided below. These examples are not meant to be mutually exclusive, exhaustive, or restrictive; and the invention is not limited to these example embodiments but rather encompasses all possible modifications and variations within the scope of the issued claims and their equivalents.

EC 1. A passenger seat arrangement for a single-aisle aircraft comprising: a first passenger seat comprising a first seat base, a first seat back, and a first seat plane; a second passenger seat comprising a second seat base, a second seat back, and a second seat plane; and an aisle defined between the first passenger seat and the second passenger seat and comprising an aisle plane extending in a forward and aft direction, wherein the first passenger seat is a non-lie flat passenger seat moveable between an upright position and a neutral position and wherein the first seat back is at a non-zero angle relative to the first seat base in both the upright position and the neutral position, wherein the second passenger seat is a non-lie flat passenger seat movable between an upright position and a neutral position and wherein the second seat back is at a non-zero angle relative to the second seat base in both the upright position and the neutral position, wherein the first seat plane is at a non-square and non-zero acute angle relative to the aisle plane, and wherein the second seat plane is at a non-square and non-zero acute angle relative to the aisle plane.

EC 2. The passenger seat arrangement of any of the preceding or subsequent example combinations, wherein the first seat plane and the second seat plane are each at the non-square and non-zero acute angle in the aft direction such that a front surface of the first seat back is aft-facing and a front surface of the second seat back is aft-facing.

EC 3. The passenger seat arrangement of any of the preceding or subsequent example combinations, wherein the first seat plane and the second seat plane are each at the non-square and non-zero acute angle in the forward direction such that a front surface of the first seat back is forward-facing and a front surface of the second seat back is forward-facing.

EC 4. The passenger seat arrangement of any of the preceding or subsequent example combinations, wherein the acute angle between the first seat plane and the aisle plane is greater than 50 degrees and less than 90 degrees.

EC 5. The passenger seat arrangement of any of the preceding or subsequent example combinations, wherein the acute angle is 70 degrees.

EC 6. The passenger seat arrangement of any of the preceding or subsequent example combinations, wherein the acute angle between the first seat plane and the aisle plane is a mirrored angle of the angle between the second seat plane and the aisle plane about the aisle plane.

EC 7. The passenger seat arrangement of any of the preceding or subsequent example combinations, wherein one of the first seat plane or the second seat plane is at the non-square and non-zero acute angle in the aft direction such that one of the first seat back or the second seat back is aft-facing, and wherein the other of the first seat plane or the second seat plane is at the non-square and non-zero acute angel in the forward direction such that the other of the first seat back or the second seat back is forward-facing.

EC 8. The passenger seat arrangement of any of the preceding or subsequent example combinations, wherein the first seat back and the second seat back are both inboard-facing and face the aisle.

EC 9. The passenger seat arrangement of any of the preceding or subsequent example combinations, wherein the first seat back and the second seat back are both outboard-facing and face away from the aisle.

EC 10. The passenger seat arrangement of any of the preceding or subsequent example combinations, wherein one of the first seat back or the second seat back is inboard-facing and facing the aisle, and wherein the other of the first seat back or the second seat back is outboard-facing and facing away from the aisle.

EC 11. The passenger seat arrangement of any of the preceding or subsequent example combinations, wherein the first passenger seat and the second passenger seat each have direct access to the aisle.

EC 12. The passenger seat arrangement of any of the preceding or subsequent example combinations, further comprising: a third passenger seat aft of the first passenger seat and comprising a third seat base, a third seat back, and a third seat plane, wherein the third passenger seat is a non-lie flat passenger seat moveable between an upright position and a neutral position and wherein the third seat back is at a non-zero angle relative to the third seat base in both the upright position and the neutral position; and a fourth passenger seat aft of the second passenger seat and comprising a fourth seat base, a fourth seat back, and a fourth seat plane, wherein the fourth passenger seat is a non-lie flat passenger seat moveable between an upright position and a neutral position and wherein the fourth seat back is at a non-zero angle relative to the fourth seat base in both the upright position and the neutral position, wherein the aisle is defined between the third passenger seat and the fourth passenger seat, wherein the third seat plane is at a non-square and non-zero acute angle relative to the aisle plane, wherein the fourth seat plane is at a non-zero and non-zero acute angle relative to the aisle plane, and wherein the first passenger seat, second passenger seat, third passenger seat, and fourth passenger seat each have direct access to the aisle.

EC 13. The passenger seat arrangement of any of the preceding or subsequent example combinations, wherein a width of the aisle when the first passenger seat and the second passenger seat are in the upright positions is the same as a width of the aisle when the first passenger seat and the second passenger seat are in the neutral positions.

EC 14. A method of installing a passenger seat arrangement in a single-aisle aircraft comprising: providing a first passenger seat comprising a first seat base, a first seat back, and a first seat plane, wherein the first passenger seat is a non-lie flat passenger seat moveable between an upright position and a neutral position and wherein the first seat back is at a non-zero angle relative to the first seat base in both the upright position and the neutral position; providing a second passenger seat comprising a second seat base, a second seat back, and a second seat plane, wherein the second passenger seat is a non-lie flat passenger seat movable between an upright position and a neutral position and wherein the second seat back is at a non-zero angle relative to the second seat base in both the upright position and the neutral position; defining an aisle having an aisle plane extending in a forward and aft direction between the first passenger seat and the second passenger seat; positioning the first passenger seat such that the first seat plane is at a non-square and non-zero acute angle relative to the aisle plane; and positioning the second passenger seat such that the second seat plane is at a non-square and non-zero acute angle relative to the aisle plane.

EC 15. The method of any of the preceding or subsequent example combinations, wherein positioning the first passenger seat comprises providing direct aisle access to the first passenger seat, and wherein positioning the second passenger seat comprises providing direct aisle access to the second passenger seat.

EC 16. The method of any of the preceding or subsequent example combinations, wherein positioning the first passenger seat and the second passenger seat comprises angling the first seat plane and the second seat plane at the non-square and non-zero acute angle in the aft direction such that a front surface of the first seat back is aft-facing and a front surface of the second seat back is aft-facing.

EC 17. The method of any of the preceding or subsequent example combinations, wherein positioning the first passenger seat and the second passenger seat comprises angling the first seat plane and the second seat plane at the non-square and non-zero acute angle in the forward direction such that a front surface of the first seat back is forward-facing and a front surface of the second seat back is forward-facing.

EC 18. The method of any of the preceding or subsequent example combinations, wherein positioning the first passenger seat and the second passenger seat comprises angling the first passenger seat and the second passenger seat such that the angle between the first seat plane and the aisle plane is a mirrored angle of the angle between the second seat plane and the aisle plane.

EC 19. The method of any of the preceding or subsequent example combinations, wherein positioning the first passenger seat comprises angling the first passenger seat such that the acute angle between the first seat plane and the aisle plane is 70 degrees.

EC 20. A passenger seat for a single-aisle aircraft comprising: a seat base; a seat back; and a central plane, wherein the seat base and the seat back are aligned along the central plane, wherein the passenger seat is a non-lie flat passenger seat moveable between an upright position and a neutral position, wherein the seat back is at a non-zero angle relative to the seat base in both the upright position and the neutral position, and wherein the passenger seat is configured for arrangement in the single-aisle aircraft such that the central plane of the passenger seat is at a non-square and non-zero acute angle relative to a longitudinal plane of the single-aisle aircraft.

EC 21. The passenger seat of any of the preceding or subsequent example combinations, wherein the acute angle between the central plane and the longitudinal plane is greater than 50 degrees and less than 90 degrees.

EC 22. The passenger seat of any of the preceding or subsequent example combinations, wherein the acute angle is 70 degrees.

EC 23. The passenger seat of any of the preceding or subsequent example combinations, wherein the angle between the seat back and the seat base in the upright position and the angle between the seat back and the seat base in the neutral position are different.

EC 24. The passenger seat of any of the preceding or subsequent example combinations, wherein the angle between the seat back and the seat base in the upright position is 96 degrees and wherein the angle between the seat back and the seat base in the neutral position is 130 degrees.

It should be emphasized that the above-described aspects are merely possible examples of implementations, merely set forth for a clear understanding of the principles of the present disclosure. Many variations and modifications can be made to the above-described embodiment(s) without departing substantially from the spirit and principles of the present disclosure. All such modifications and variations are intended to be included herein within the scope of the present disclosure, and all possible claims to individual aspects or combinations of elements or steps are intended to be supported by the present disclosure. Moreover, although specific terms are employed herein, as well as in the claims that follow, they are used only in a generic and descriptive sense, and not for the purposes of limiting the described invention, nor the claims that follow.

That which is claimed:

1. A passenger seat arrangement for a single-aisle aircraft comprising:
   a first side-facing passenger seat comprising a first seat base, a first seat back, and a first seat plane;
   a first privacy console supporting the first passenger seat
   a second side-facing passenger seat comprising a second seat base, a second seat back, and a second seat plane;
   a second privacy console supporting the second passenger seat; and
   an aisle defined between the first passenger seat and the second passenger seat and comprising an aisle plane extending in a forward and aft direction,
   wherein the first passenger seat is a non-lie flat passenger seat moveable only between an upright position and a neutral position and wherein the first seat back is at a non-zero angle relative to the first seat base in both the upright position and the neutral position, wherein the first seat back is at an angle from about 90 degrees to about 100 degrees relative to the first seat base in the upright position, wherein the first seat back is at an angle from about 125 degrees to about 135 degrees relative to the first seat base in the neutral position, and wherein, in the neutral position, the first passenger seat is configured to support a passenger such that the passenger's head and knees are elevated above a lower back region of the passenger and such that the knees are elevated compared to the upright position,
   wherein the second passenger seat is a non-lie flat passenger seat movable only between an upright position and a neutral position and wherein the second seat back is at a non-zero angle relative to the second seat base in both the upright position and the neutral position, wherein the second seat back is at an angle from about 90 degrees to about 100 degrees relative to the second seat base in the upright position, and wherein the second seat back is at an angle from about 125 degrees to about 135 degrees relative to the second seat base in the neutral position,
   wherein the first seat plane is at a non-square and non-zero acute angle relative to the aisle plane and such that the first seat plane is closer to perpendicular than parallel relative to the aisle plane,
   wherein the second seat plane is at a non-square and non-zero acute angle relative to the aisle plane and such that the second seat plane is closer to perpendicular than parallel relative to the aisle plane, and wherein a position of the first privacy console relative to the aisle and a position of the second privacy console relative to the aisle is fixed.

2. The passenger seat arrangement of claim 1, wherein the first seat plane and the second seat plane are each at the non-square and non-zero acute angle in the aft direction such that a front side of the first seat back is aft-facing and a front side of the second seat back is aft-facing.

3. The passenger seat arrangement of claim 1, wherein the first seat plane and the second seat plane are each at the non-square and non-zero acute angle in the forward direction such that a front side of the first seat back is forward-facing and a front side of the second seat back is forward-facing.

4. The passenger seat arrangement of claim 1, wherein one of the first seat plane or the second seat plane is at the non-square and non-zero acute angle in the aft direction such that one of the first seat back or the second seat back is aft-facing, and wherein the other of the first seat plane or the second seat plane is at the non-square and non-zero acute angel in the forward direction such that the other of the first seat back or the second seat back is forward-facing.

5. The passenger seat arrangement of claim 1, wherein the first seat back and the second seat back are both inboard-facing and face the aisle.

6. The passenger seat arrangement of claim 1, wherein the first seat back and the second seat back are both outboard-facing and face away from the aisle.

7. The passenger seat arrangement of claim 1, wherein one of the first seat back or the second seat back is inboard-facing and facing the aisle, and wherein the other of the first seat back or the second seat back is outboard-facing and facing away from the aisle.

8. The passenger seat arrangement of claim 1, wherein the first passenger seat and the second passenger seat each have direct access to the aisle.

9. The passenger seat arrangement of claim 1, further comprising:
a third passenger seat aft of the first passenger seat and comprising a third seat base, a third seat back, and a third seat plane, wherein the third passenger seat is a non-lie flat passenger seat moveable between an upright position and a neutral position and wherein the third seat back is at a non-zero angle relative to the third seat base in both the upright position and the neutral position; and
a fourth passenger seat aft of the second passenger seat and comprising a fourth seat base, a fourth seat back, and a fourth seat plane, wherein the fourth passenger seat is a non-lie flat passenger seat moveable between an upright position and a neutral position and wherein the fourth seat back is at a non-zero angle relative to the fourth seat base in both the upright position and the neutral position,
wherein the aisle is defined between the third passenger seat and the fourth passenger seat,
wherein the third seat plane is at a non-square and non-zero acute angle relative to the aisle plane,
wherein the fourth seat plane is at a non-zero and non-zero acute angle relative to the aisle plane, and
wherein the first passenger seat, second passenger seat, third passenger seat, and fourth passenger seat each have direct access to the aisle.

10. The passenger seat arrangement of claim 1, wherein a width of the aisle when the first passenger seat and the second passenger seat are in the upright positions is the same as a width of the aisle when the first passenger seat and the second passenger seat are in the neutral positions.

11. The passenger seat of claim 1, wherein the aisle comprises a floor plane, and wherein, in the upright position of the first passenger seat, the first seat base is at an angle of about 7 degrees off the floor plane, and wherein, in the neutral position, the first seat base is at an angle of about 15 degrees off the floor plane.

12. A method of installing a passenger seat arrangement in a single-aisle aircraft comprising:
providing a first side-facing passenger seat comprising a first seat base, a first seat back, and a first seat plane, wherein the first passenger seat is supported by a first privacy console, wherein the first passenger seat is a non-lie flat passenger seat moveable between an upright position and a neutral position and wherein the first seat back is at a non-zero angle relative to the first seat base in both the upright position and the neutral position, wherein the first seat back is at an angle from about 90 degrees to about 100 degrees relative to the first seat base in the upright position, wherein the first seat back is at an angle from about 125 degrees to about 135 degrees relative to the first seat base in the neutral position, and wherein, in the neutral position, the first passenger seat is configured to support a passenger such that the passenger's head and knees are elevated above a lower back region of the passenger and such that the knees are elevated compared to the upright position;
providing a second side-facing passenger seat comprising a second seat base, a second seat back, and a second seat plane, wherein the second passenger seat is supported by a second privacy console, wherein the second passenger seat is a non-lie flat passenger seat movable between an upright position and a neutral position and wherein the second seat back is at a non-zero angle relative to the second seat base in both the upright position and the neutral position, wherein the second seat back is at an angle from about 90 degrees to about 100 degrees relative to the second seat base in the upright position, and wherein the second seat back is at an angle from about 125 degrees to about 135 degrees relative to the second seat base in the neutral position;
defining an aisle having an aisle plane extending in a forward and aft direction between the first passenger seat and the second passenger seat;
positioning the first passenger seat such that the first seat plane is at a non-square and non-zero acute angle relative to the aisle plane and such that the first seat plane is closer to perpendicular than parallel relative to the aisle plane; and
positioning the second passenger seat such that the second seat plane is at a non-square and non-zero acute angle relative to the aisle plane and such that the second seat plane is closer to perpendicular than parallel relative to the aisle plane,
wherein a position of the first privacy console relative to the aisle and a position of the second privacy console relative to the aisle is fixed.

13. The method of claim 12, wherein positioning the first passenger seat comprises providing direct aisle access to the first passenger seat, and wherein positioning the second passenger seat comprises providing direct aisle access to the second passenger seat.

14. The method of claim 12, wherein positioning the first passenger seat and the second passenger seat comprises angling the first seat plane and the second seat plane at the non-square and non-zero acute angle in the aft direction such that a front surface of the first seat back is aft-facing and a front surface of the second seat back is aft-facing.

15. The method of claim 12, wherein positioning the first passenger seat and the second passenger seat comprises angling the first seat plane and the second seat plane at the non-square and non-zero acute angle in the forward direction such that a front surface of the first seat back is forward-facing and a front surface of the second seat back is forward-facing.

16. The method of claim 12, wherein positioning the first passenger seat and the second passenger seat comprises angling the first passenger seat and the second passenger seat such that the angle between the first seat plane and the aisle plane is a mirrored angle of the angle between the second seat plane and the aisle plane.

17. The method of claim 12, wherein positioning the first passenger seat comprises angling the first passenger seat such that the acute angle between the first seat plane and the aisle plane is 70 degrees.

18. A passenger seat for a single-aisle aircraft comprising:
a seat base;
a seat back; and
a central plane,
wherein the seat base and the seat back are aligned along the central plane,
wherein the passenger seat is a non-lie flat passenger seat moveable only between an upright position and a neutral position, wherein the seat back is at a non-zero angle relative to the seat base in both the upright position and the neutral position, wherein the seat back is at an angle from about 90 degrees to about 100 degrees relative to the seat base in the upright position, wherein the seat back is at an angle from about 125 degrees to about 135 degrees relative to the seat base in the neutral position, and wherein, in the neutral position, the passenger seat is configured to support a passenger such that the passenger's head and knees are elevated above a lower back region of the passenger and such that the knees are elevated compared to the upright position, and
wherein the passenger seat is configured for arrangement in the single-aisle aircraft such that the central plane of the passenger seat is at a non-square and non-zero acute angle relative to a longitudinal plane of the single-aisle aircraft and such that the central plane is closer to perpendicular than parallel relative to the longitudinal plane and the passenger seat is side-facing.

19. The passenger seat of claim 18, wherein the acute angle between the central plane and the longitudinal plane is greater than 50 degrees and less than 90 degrees.

20. The passenger seat of claim 19, wherein the acute angle is 70 degrees.

* * * * *